United States Patent [19] [11] 4,376,173
Blount [45] * Mar. 8, 1983

[54] PROCESS FOR THE PRODUCTION OF POLYEPOXY SILICATE RESINS

[76] Inventor: David H. Blount, 5450 Lea St., San Diego, Calif. 92105

[*] Notice: The portion of the term of this patent subsequent to Feb. 2, 1999, has been disclaimed.

[21] Appl. No.: 364,613

[22] Filed: Apr. 1, 1982

Related U.S. Application Data

[60] Division of Ser. No. 306,184, Sep. 28, 1981, which is a continuation-in-part of Ser. No. 257,126, Apr. 24, 1981, which is a continuation-in-part of Ser. No. 203,730, Nov. 3, 1980, which is a continuation-in-part of Ser. No. 112,290, Jan. 15, 1980, which is a continuation-in-part of Ser. No. 29,202, Apr. 12, 1979.

[51] Int. Cl.$^3$ .................... C08J 9/00; C08G 77/02; C08L 63/00
[52] U.S. Cl. ........................ 521/137; 521/109; 521/122; 521/151; 521/154; 524/733; 524/735; 525/476; 527/105; 527/300; 527/301; 527/303; 527/305
[58] Field of Search ............... 521/109, 122, 137, 151, 521/154; 524/733, 735; 525/476; 527/105, 300, 301, 303, 305

[56] References Cited

U.S. PATENT DOCUMENTS

| | | | |
|---|---|---|---|
| 4,260,696 | 4/1981 | Blount | 521/154 |
| 4,281,107 | 7/1981 | Blount | 521/154 |
| 4,283,311 | 8/1981 | Blount | 521/175 |
| 4,313,857 | 2/1982 | Blount | 528/44 |

Primary Examiner—Morton Foelak

[57] ABSTRACT

Alkali metal aldehyde lignin-cellulose silicate polymers are reacted chemically with an epihalohydrin compound to produce a polyepoxy silicate resin; the polyepoxy silicate resin may be cured by a catalyst, e.g., an amine or Lewis acid, to produce a cured epoxy resin, solid or cellular solid product which may be used as an adhesive, as construction sheets, etc.

17 Claims, No Drawings

PROCESS FOR THE PRODUCTION OF POLYEPOXY SILICATE RESINS

CROSS-REFERENCE TO RELATED APPLICATIONS

This application is a divisional of U.S. pat. application Ser. No. 306,184, filed on Sept. 28, 1981, which is a continuation-in-part of U.S. patent application No. 257,126, filed on Apr. 24, 1981, which is a continuation-in-part of copending U.S. patent application, Ser. No. 203,730, filed on Nov. 3, 1980, which is a continuation-in-part of U.S. patent application No. 112,290, filed on Jan. 15, 1980, which is a continuation-in-part of my U.S. patent application, Ser. No. 029,202, filed on Apr. 12, 1979, which is a continuation-in-part of my U.S. Pat. No. 4,220,757.

SUMMARY OF THE INVENTION

This invention relates to the production of polyepoxy silicate resins by chemically reacting a polyfunctional epoxy compound such as an epihalohydrin with broken-down alkali metal aldehyde lignin-cellulose silicate polymers. The polyepoxy silicate resin is then cured with a curing agent (catalyst) such as a polyamine or a Lewis catalyst.

The processes for producing the broken-down alkali metal plant silicate polymer and alkali metal aldehyde lignin-cellulose silicate polymer are outlined in U.S. patent application No. 029,202, filed on Apr. 12, 1979 by David H. Blount, M.D., and are incorporated into this application.

Polyepoxy compounds and resins and phenoxy resins may be mixed with the aldehyde lignin-cellulose silicate polyepoxy resin and then cured by a catalyst. An excess of polyfunctional epoxide compound may be used with the aldehyde lignin-cellulose silicate polyepoxy resin as a diluent which will also speed up the curing reaction to decrease the curing time.

Any suitable modifying or additive compounds may be used in the reaction of this invention to vary properties of the product. Typical additives include halohydrins, aldehydes, polyhydroxy compounds, dicarboxylic anhydrides, polysulfide polymers, alkali polysulfides, aminoplasts, phenoplasts, fatty or rosin acid, furfuralketone resins, dibutyl phthalate, tricresyl phosphate, polyamides, fatty diamines, styrene oxide, propylene oxide, acetonitriles, primary aromatic sulfonamides, secondary aromatic sulfonamides, polymerized oils, carbon disulfide, soya bean oil, alicyclic anhydrides, aminoplast silicates, phenoplast silicates, alkali metal polysulfide silicates, acrylic silicates, acrylic monomers, vinyl acetate, acrylonitrite, phenol compounds and other organic compounds and polymers.

While a variety of epoxy compounds and resins have been produced for a number of diverse applications, none have the unique properties possessed by the compounds of this invention. The aldehyde lignin-cellulose silicate polyepoxy resins with a curing agent may be used as adhesives, as molding materials, in casting applications, as coating agents on wood and metals, in dispersions, as fillers, as prepolymers, reacted with polyisocyanates to produce foams for insulation and in the production of further compounds.

The primary object of the present invention is to produce aldehyde lignin-cellulose silicate polyepoxy resins. Another object is to produce an aldehyde lignin-cellulose silicate polyepoxy resin which is relatively inexpensive and may be cured by heat and/or a curing agent to produce a useful and novel product. A further object is to produce aldehyde lignin-cellulose silicate polyepoxy resin that can be mixed with a polyepoxy compound and cured by a curing agent to produce a useful and novel product. Still another object is to produce aldehyde lignin-cellulose silicate polyepoxy resin that may be mixed with a phenoxy resin and then cured by a curing agent to produce a useful and novel product. A further object is to produce aldehyde lignin-cellulose silicate resin that may be mixed with a curing agent, then painted on wood or metal and used as a coating agent and/or an adhesive.

The aldehyde lignin-cellulose silicate polyepoxy resins may be modified to contain free hydroxyl groups by adding halohydrin, mono-epoxide compounds, e.g., alkyleneoxide, tetrahydrofuran, styrene oxide, polyhydroxy compounds, and mixtures thereof to the Components A and B to produce a liquid lignin-cellulose silicate polyepoxy resin which may be reacted with polyisocyanates to produce polyurethane rigid foams and solid products. The foams may be used for thermal and sound insulation, in construction panels, in art objects, etc. Amines such as tertiary amines which contain hydrogen atoms which are reactive with isocyanate groups, e.g., triethanolamine, triisosopanolamine may be added with the modifying compounds, halohydrins, mono-epoxide compounds, polyhydroxy compound and mixtures thereof to produce a liquid aldehyde lignin-cellulose silicate polyepoxy resin which contains free hydroxyl groups and contains a polyisocyanate catalyst. This resin will react with polyisocyanates to produce polyurethane resinous products and foam.

Aldehyde lignin-cellulose silicate polyepoxy resins are produced by mixing and reacting the following components:
 A. Polyfunctional epoxide compound;
 B. Broken-down alkali metal aldehyde lignin-cellulose silicate polymer.

Aldehyde lignin-cellulose silicate polyepoxy resins are cured by the following catalysts:
 (a) amines;
 (b) Lewis acids;
 (c) alkali metal oxides or hydroxides;
 (d) mercaptans;
 (e) compounds containing hydrogen replaced by sodium;
 (f) phenols, phenol silicates;
 (g) alcohols, organic hydroxy silicates;
 (h) alicyclic anhydrides, organic polyanhydrides;
 (i) aminosilicates with free amine groups;
 (j) phenoplasts and aminoplasts;
 (k) phenoplast silicates and aminoplast silicates;
 (l) polyamides, polyamide silicates;
 (m) heat to between 80° C. and 200° C.

Component A

Any suitable polyfunctional epoxide compounds may be used in this invention. Suitable polyfunctional epoxide compounds include substituted epoxide compounds such as epihalohydrin, di-epiiodohydrin, epifluorohydrin, epiiodohydrin and substituted butylene oxides, e.g., trichlorobutylene oxide and mixtures thereof. Epichlorohydrin is the preferred polyfunctional epoxide compound.

Component B

The broken-down water-soluble alkali metal plant silicate polymer is produced by heating a mixture of 3 parts by weight of a cellulose-containing plant with 2 to 5 parts by weight of an alkali metal hydroxide and 1 to 2 parts by weight of an oxidated silicon compound at 150° C. to 220° C. while agitating for 5 to 60 minutes. The broken-down alkali metal cellulose silicate polymer is soluble in water, alcohols, polyols and other organic solvents and is a thick liquid above 150° C. and a brown solid below 150° C. The broken-down alkali metal plant silicate polymer has lost a carbon dioxide radical from each molecule and the lignin-cellulose bond appears to be intact. When a plant product (cellulose) with the lignin removed is used in the production of broken-down alkali metal plant silicate polymer, a dark-brown-colored water-soluble polymer is produced.

The alkali metal aldehyde lignin-cellulose silicate polymer is produced by reacting a suitable aldehyde with the broken-down water-soluble alkali metal plant silicate polymer. About 2 parts by weight of the broken-down water-soluble alkali metal plant silicate polymer are mixed with 1 to 5 parts by weight of an aldehyde selected from the group consisting of formaldehyde, acetaldehyde, propionic aldehyde, furfural, crotonaldehyde, acrolein, benzaldehyde, butyl aldehyde, pentanals, octanals and mixtures thereof, then agitated at a temperature between ambient temperature and 100° C. for 10 to 120 minutes, thereby producing an alkali metal aldehyde lignin-cellulose silicate polymer. An aqueous solution of formaldehyde is the preferred aldehyde.

Any suitable alkali metal hydroxide may be used to produce broken-down alkali metal plant silicate polymers; sodium hydroxide is preferred. Any suitable cellulose-containing plant or plant product may be used to produce broken-down alkali metal plant silicate polymers such as trees, shrubs, agricultural plants, seaweed, pulp wood, cotton, decomposed cellulose-containing plants such as humus, peat and certain soft brown coal, etc.

SUMMARY OF THE INVENTION

I have discovered that a polyfunctional epoxide compound, preferably a polyfunctional halogenated epoxy compound, e.g., epichlorohydrin, will react chemically with an alkali metal aldehyde lignin-cellulose silicate polymer to produce an aldehyde lignin-cellulose silicate polyepoxy resin which may be cured by a catalytic amount of a curing agent, e.g., amines, Lewis acids and alkali compounds.

The chemical reactions of this invention may take place under any suitable conditions. While many of the reactions will take place acceptably at ambient temperature and pressure. In some cases, better results are obtained at somewhat elevated temperature and pressure. Preferably, the reaction takes place at a temperature between 10° C. and the boiling temperature of the reactants and at a pressure wherein the gaseous reactants are in either a liquid state or a compressed stste. The reaction is exothermic and, in some cases, it is necessary to cool the materials.

The components may be mixed in any suitable manner. The preferred method is to mix the Components A (epoxy compound), and B (an alkali metal aldehyde lignin-cellulose silicate polymer and water) in a closed system with an agitator, agitating the mixture at a pressure between ambient and 50 psig and between ambient temperature and the boiling temperature of the polyfunctional epoxy compound or water for from 30 minutes to 4 hours, thereby producing an aldehyde lignin-cellulose silicate polyepoxy resin.

In an alternate method, Component A is added to Component B while agitating at a temperature between 10° C. and just below the boiling temperature of the reactants for from 30 minutes to 4 hours.

The water-free aldehyde lignin-cellulose resin may be diluted with a solvent, e.g., epichlorohydrin and ethylene chlorohydrin, then the unreacted aldehyde lignin-cellulose silicate polymer and salt produced in the reaction will be precipitated and may be removed by decantation. The excess polyfunctional epoxy compound may be removed by evaporation.

In an alternate method, an additional step is taken wherein a suitable organic polyhydroxyl compound is added with the components in the amount of up to 50 parts by weight to 100 parts by weight of Components A and is reacted in the same method used in the preferred method. In certain cases, better results are obtained by utilizing an autoclave with somewhat elevated pressure.

In another alternate method, an additional step is taken wherein a suitable organic polyepoxy compound and/or resin is mixed with the aldehyde lignin-cellulose silicate polyepoxy resin in the amount of up to 100 parts by weight of the polyepoxy resin to 50 parts by weight of the aldehyde lignin-cellulose silicate polyepoxy resin. The mixture is then cured by a catalytic amount of an epoxy curing agent to produce a tough solid product. In certain cases, the mixture may be cured by heat.

In another method, an additional step is taken wherein a phenoxy resin is mixed with the aldehyde lignin-cellulose silicate polyepoxy resin in the amount of up to 100 parts by weight of the phenoxy resin to 100 parts by weight of the aldehyde lignin-cellulose silicate polyepoxy resin. The mixture is then cured by a catalytic amount of an epoxy curing agent, e.g., Lewis acid and/or with heat.

The components may be mixed in any suitable proportions within the following limits:
 Component A: 10 to 200 parts by weight;
 Component B: 50 parts by weight;
 Water: Up to 200 parts by weight to 50 parts by weight of Component B.

An excess of Component A may be used and remain as a solvent or be evaporated out by heating. An excess of the alkali metal aldehyde lignin-cellulose silicate polymer should be avoided because it will act as a curing agent and cure the aldehyde lignin-cellulose silicate polyepoxy resin into a solid product.

The additives may be added in any suitable proportions, within the following ranges:
 (a) Curing agent: Up to 200 parts by weight of a curing agent to 100 parts by weight of the aldehyde lignin-cellulose silicate polyepoxy resin;
 (b) Polyhydroxyl compound: Up to 50 parts by weight to each 50 parts by weight of Component B;
 (c) Polyepoxy compound and/or resin: Up to 100 parts by weight of aldehyde lignin-cellulose silicate polyepoxy resin;
 (d) Phenoxy resin: Up to 100 parts by weight to each 100 parts by weight of the aldehyde lignin-cellulose silicate polyepoxy resin;
 (e) Phenol compound: Up to 50 parts by weight to each 50 parts by weight of Component B;

(f) Halohydrin: Up to 50 parts by weight to each 50 parts by weight of Component B;

(g) Mono-epoxide: Up to 100 parts by weight to each 50 parts by weight of Component B.

Curing Catalyst

Any suitable epoxy resin curing catalyst may be used in this invention. Suitable curing catalysts include amines, Lewis acids, alkali metal oxides and hydroxides, and mercaptan-terminated liquid compounds.

The mercaptan-terminated, saturated type of elastomer may cure the aldehyde lignin-cellulose silicate polyepoxy resin at ambient or elevated temperature and may also be mixed with the amine and used as a curing agent. Any mixtures of the various curing agents such as amines, certain Lewis acids, mercaptan-terminated compound and alkali metal compounds may be used as the curing agent.

Any suitable Lewis acid may be used in this invention. A Lewis acid is any electron acceptor relative to other reagents present in the system. A Lewis acid will tend to accept a pair of electrons furnished by an electron donor (or Lewis base) in the process of forming a chemical compound. a "Lewis acid" is defined for the purpose of this invention as any electron-accepting material relative to the polymer to which it is complexed.

Typical Lewis acids are: quinones, such as:
p-benzo-quinone,
2,5-dichlorobenzoquinone,
2,6-dichlorobenzoquinone,
chloranil,
naphthoquinone-(1,4),
anthraquinone,
2-methylanthraquinone,
1,4-dimethylanthraquinone,
1-chloroanthraquinone,
anthraquinone-2-carboxylic acid,
1,5-dichloroanthraquinone,
1-chloro-4-nitroanthraquinone,
phenanthrene-quinone,
acenaphenequinone,
pyranthrenequinone,
chrysenequinone,
thio-naphthene-quinone,
anthraquinone-1,8-disulfonic acid and anthraquinone-2-aldehyde;
triphthaloylbenzene-aldehydes such as: bromal,
4-nitrobenzaldehyde,
2,6-dichlorobenzaldehyde-2,
ethoxy-1-naphthalidehyde,
anthracene-9-aldehyde,
pyrene-3-aldehyde,
oxindole-3-aldehyde,
pyridine-2,6-dialdehyde,
biphenyl-4-aldehyde;
organic phosphonic acids such as:
4-chloro-2-nitrobenzene-phosphonic acid nitrophenols, such as 4-nitrophenol, picric acid;
acid anhydrides, for example:
acetic-anhydride,
succinic anhydride,
maleic anhydride,
phthalic anhydride,
tetrachlorophthalic anhydride,
perylene-3,4,9,10-tetracarboxylic acid and chrysene-2,3,8,9-tetracarboxylic anhydride,
di-bromo maleic acid anhydride;
metal halides of the metals and metalloids of the groups 1B, II through to group VIII of the periodical system, for example:
aluminum chloride,
zinc chloride,
ferric chloride,
tin tetrachloride,
(stannic chloride),
arsenic trichloride,
stannous chloride,
antimony pentachloride,
magnesium chloride,
magnesium bromide,
calcium bromide,
calcium iodide,
strontium bromide,
chromic bromide,
manganous chloride,
cobaltous chloride,
cobaltic chloride,
cupric bromide,
caric chloride,
chromium chloride,
arsenic tri-iodide;
boron hallide compounds, for example:
boron trifluoride,
boron trichloride;
ketones, such as:
acetophenone,
benzophenone,
2-acetylnaphthalene,
benzil,
benzoin,
5-benzoylacenaphthene,
biacene-dione,
9-acetyl-anthracene,
9-benzoyl-anthracene,
4-(4-dimethyl-amino-cinnamoyl)-1-acetylbenzene,
acetoacetic acid anilide,
indandione-(1,3),
(1,3-diketohydrindene),
acenaphthene quinone-dichloride,
anisil,
2,2-puridil and
furil.
Additional Lewis acids are mineral acids such as:
the hydrogen halides,
sulphuric acid and
phosphoric acid;
organic carboxylic acids, such as:
acetic acid and the substitution products thereof,
monochloro-acetic acid,
dichloroacetic acid,
trichloroacetic acid,
phenylacetic acid,
7-methylcoumarinylacetic acid (4);
maleic acid,
cinnamic acid,
benzoic acid,
1-(4-diethyl-amino-benzoyl)-benzene-2-carboxylic acid,
phthalic acid,
and tetra-chlorophthalic acid,
alpha-beta-dibromo-beta-formyl-acrylic acid (mucobromic acid),
dibromo-maleic acid,
2-bromo-benzoic acid,
gallic acid, 3-nitro-2-hydroxy-1-benzoic acid,
2-nitro phenoxy-acetic acid,
2-nitro-benzoic acid,
3-nitro-benzoic acid,
4-nitro-benzoic acid,
2-chloro-4-nitro-1-benzoic acid,
3-nitro-4-methoxy-benzoic acid,
4-nitro-1-methyl-benzoic acid,
2-chloro-5-nitro-1-benzoic acid,
3-chloro-6-nitro-1-benzoic acid,
4-chloro-3-nitro-1-benzoic acid,
5-chloro-3-nitro-2-hydroxybenzoic acid,
4-chloro-1-hydroxy-benzoic acid,
2,4-dinitro-1-benzoic acid,
2-bromo-5-nitro-benzoic acid,
4-chlorophenyl-acetic acid,
2-chloro-cinnamic acid,
2-cyana-cinnamic acid,
2,4-dichlorobenzoic acid,
3,5-dinitro-benzoic acid,
3,5-dinitro-salycylic acid,
malonic acid,
mucic acid,
acetosalycylic acid,
benzilic acid,
butane-tetra-carboxylic acid,
citric acid,
cyano-acetic acid,
cyclo-hexane-dicarboxylic acid,
cyclo-hexane-carboxylic acid,
1,10-dichlorostearic acid,
fumaric acid, p2 itaconic acid,
levulinic acid,
(levulic acid),
malic acid,
succinic acid,
alpha-bromo stearic acid,
citraconic acid,
dibromo-succinic acid,
pyrene-2,3,7,8-tetra-carboxylic acid,
tartaric acid;
organic sulphonic acids, such as:
4-toluene sulphonic acid, and
benzene sulphonic acid,
2,4-dinitro-1-methyl-benzene-6-sulphonic acid,
2,6-dinitro-1-hydroxy-benzene-4-sulphonic acid,
2-nitro-1-hydroxy-benzene-4-sulphonic acid,
4-nitro-1-hydroxy-2-benzene-sulphonic acid,
3-nitro-2-methyl-1-hydroxy-benzene-5-sulphonic acid,
6-nitro-4-methyl-1-hydroxy-benzene-2-sulphonic acid,
4-chloro-1-hydroxy-benzene-3-sulphonic acid,
2-chloro-3-nitro-1-methyl-benzene-5-sulphonic acid and
2-chloro-1-methyl-benzene-4-sulphonic acid.

Any suitable organic amine may be used as the curing agent; however, polyamines are preferred.

The polyamines to be used in this invention include those organic materials possessing a plurality of amino hydrogen, e.g., a plurality of:

groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine; diethylenetricamine; triethylenetetramine; tetraethylenepentamine; 1,4-diaminobutane; 1,3-diaminobutane; hexamethylenediamine; 3-(N-isopropylamine) propylamine; N,N'-diethyl-1,3-propanediamine; hexapropylene-heptamine; penta(1-methyl-propylene hexamine); tri(1,2,2-trimethylethylene) tetramine; tetra(1,3-dimethylpropylene) pentamine; penta-(1,5-dimethylamylene) hexamine; penta(1,2-dimethyl-1-isopropylethylene) hexamine and N,N'-dibutyl-1,6-hexanediamine.

Suitable aliphatic polyamines are the alkylene polyamines of the formula:

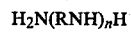

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula:

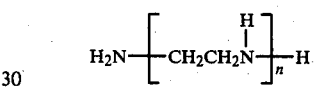

wherein n is an integer varying from about 2 to 8. A mixture of high-molecular-weight polyethylene polyamines and diethylenetriamine is especially preferred.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained from polymers or copolymers having groups reactive with amines such as, for example, aldehyde groups, as present on adrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as, for example:
1-cyclohexylamine-3-aminopropane;
1,4-diaminocyclohexane;
1,3-diaminocyclopentane;
di(aminocyclohexyl) methane;
di(aminocyclohexyl) sulfone;
1,3-di(aminocyclohexyl) propane;
2,4-diaminocyclohexane;
N,N'-diethyl-1,4-diaminocyclohexane, and the like.

Preferred members of this group comprise those polyamines having at least one amino or alkyl-substituted amino group attached directly to a cycloaliphatic ring containing 5 to 7 carbon atoms.

Other suitable polyamines comprise the aminoalkyl-substituted aromatic compounds such as, for example, di(amino-ethyl) benzene, di(aminomethyl) benzene, tri(aminoethyl) benzene, tri(aminobutyl) naphthalene and the like.

Suitable polyamines also include the organo-metallic compounds, such as those having a silicon or boron atom or atoms linked to amino or substituted amino groups. The compounds may also be those organo-metallic compounds wherein the amino group or substituted amino groups are attached to carbon, such as in the allosilylpropylamines like triethoxy silylpropylamines.

Other suitable polyamines include the N-(aminoalkyl) piperazines such as, for example, N-aminobutylpiperazine; N-aminoisopropyl-3-butoxypiperazine; N-aminoethylpiperazine; 2,5-dioctyl-N-aminoisobutylpiperazine and the like.

Another group of suitable materials is obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidal ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like. This reaction between polyamines and monoepoxide is effected merely by bringing the components together in proper proportion. The adducts are obtained when a mol of the polyamine is reacted with not more than one mol of monoepoxide. The excess amine can be retained or can be removed by distillation. Examples of the monoepoxide polyamine reaction products include, among others, N(hydroxy-propyl) diethylenetriamine (reaction product of propylene oxide and diethylenetriamine) and N(2-hydroxy-3-phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of monoamines include any of those noted above for use in the compositions of the present invention. Examples of the monoamines include, among others, secondary amines such as dimethylamine, diethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Other examples include the soluble reaction products of polyepoxides and polyamines and salts thereof, such as described in U.S. Pat. Nos. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention include those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula:

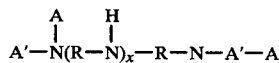

wherein x represents an integer in the range of 0 through 3 and A and A' represent a member selected from the group consisting of hydrogen and cyanoethyl radicals, and further characterized in that the amine has at least one cyanoethyl group and at least one non-tertiary amino group in the molecule. The preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula:

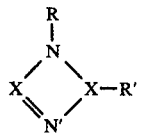

wherein X is an organic radical and preferably an alkylene radical, R is a long-chain hydrocarbon radical, and preferably one containing at least 12 carbon atoms, and R' is an organic radical containing an amine or amine-substituted group. Particularly preferred members of this group are those obtained by reacting any of the above-described polyamines with long-chain monocarboxylic acids, such as those containing at least 12 and, preferably, 16 to 30 carbon atoms, such as, for example, palmitic acid, pentadecanoic acid, 4-ketomyristic acid, 8,10-dibromostearic acid, margaric acid, stearic acid, alphachlorostearic acid, linoleic acid, oleic acid, dehydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and preferably about 0.3 to 0.5 to 1. The temperature employed preferably varies from about 100° C. to 250° C.

Suitable polyamines include the aromatic polyamines, especially those having at least two —NH₂ groups attached to aromatic ring or rings and containing up to 25 carbon atoms.

Suitable polyamines include the sulfur- and/or phosphorous-containing polyamines such as may be obtained by reacting a mercaptan- or phosphine-containing active hydrogen with an epoxy halide to form a halohydrin, dihydrochlorinating and then reacting the resulting compound with a polyamine, N-(3-ethylthio-2-hydropropyl) diethylenetriamine may be prepared, for example, by reacting ethyl mercaptan with epichlorohydrin, dihydrochlorinating and then reacting the resulting epoxy compound with diethylenetriamine. Suitable examples of such compounds include, among others:

N-(3-butylthio-2-hydroxypropyl) triethylenetetramine,
N-(4-phenylthio-3-hydrobutyl) pentamethylenetetramine,
N-(4-cyclohexylthio-3-hydrobutyl) ethylenediamine,
N-(3-cyclohexylthio-2-hydropropyl) hexamethylenediamine,
N-(3-diphenylphosphino-2-hydroxypropyl) triethylenetetramine,
N-(3-dicyclohexylphosphino-2-hydroxypropyl) pentamethylenetetramine,
N-(3-dididecylphosphino-2-hydroxyhexyl) diethylenetriamine, and
N-(3-allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloalkyl phosphinohydroxyalkyl) aliphatic and aromatic polyamines and the N-(diaryl-phosphinohydroxyalkyl) aliphatic and aromatic polyamines.

Suitable polyamines include the polyamines of the formula:

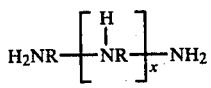

wherein x is an integer of 0 to 10 and R is bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms.

Salts of polyamines and fatty acid (e.g., stearic, linoleic acid, decanoic acid, lauric acid, oleic acids and the like) may be used in this invention.

Aminoplasts, phenoplasts, aminoplast silicates, phenoplast silicates, aminosilicate compounds and mixtures thereof, or with other curing agents, may be used as curing agents. These types of curing agent usually require curing at high temperatures and, in some cases, a small amount of an acid catalyst.

Suitable organic polyhydroxyl compound may be added with the polyfunctional epoxy compound (Component A) to produce an aldehyde lignin-cellulose polyepoxy resin. Suitable polyhydroxyl compounds include di(mono-hydroxy) alkanes, poly(monohydroxyl) alkanes and di(monohydroxyaryl)-alkanes. Other hydroxy-containing compounds such as resorcinol, hydroquinone glycols, glycerol and mixtures thereof. Best results are obtained when using [bisphenol-A, 2,2-(4-bishydroxy-phenyl)-propane], in the preparation of the aldehyde lignin-cellulose polyepoxy resin.

Typical di(monohydroxyaryl)-alkanes are:
2,2'-bis(3,5-dibromo-4-hydroxy-phenyl)-propane,
2,2'-bis(3,5-dichloro-4-hydroxy-phenyl)-propane,
(4,4'-dihydroxy-diphenyl)-methane,
2,2-(4-bis-hydroxy-phenyl)-propane,
1,1-(4,4'-dihydroxy-diphenyl)-cyclohexane,
1,1-(4,4'-dihydroxy-3,3'-dimethyl-diphenyl)-cyclohexane,
1,1-(2,2'-dihydroxy-4,4'-dimethyl-diphenyl)-butane,
2,2-(2,2'-dihydroxy-4,4'-di-tert-butyl-butyl-diphenyl)-propane;
1,1'-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxydiphenyl)-pentane,
2,2-(4,4'-dihydroxy-diphenyl)-hexane,
3,3-(4,4'-dihydroxy-diphenyl)-hexane,
2,2-(4,4'-dihydroxy-diphenyl)-4-methyl-pentane(-dihydroxy-diphenyl)-heptane,
4,4-(4,4'-dihydroxy-diphenyl)-heptane,
2,2-(4,4'-dihydroxy-diphenyl)-tridecane,
2,2-(4,4'-dihydroxy-3'-methyl-diphenyl)-propane,
2,2-(4,4'-dihydroxy-3-methyl-3'-isopropyl-diphenyl)-butane,
2,2-(3,5,3',5'-tetra-chloro-4,4'-dihydroxy-diphenyl)-propane,
2,2-(3,5,3',5'-tetrabromo-4,4'-dihydroxy-diphenyl)-propane,
(3,3'-dichloro-4,4'-dihydroxy-diphenyl)-methane and
2,2'-(dihydroxy-5,5'-difluoro-diphenyl)-methane,
(4,4'-dihydroxy-diphenyl)-phenyl-methane,
1,1-(4,4'-dihydroxy-diphenyl)-1-phenyl-ethane, and mixtures thereof.

The poly(monohydroxy) alkanes are preferred to be polyols (organic polyhydroxyl compound), in particular, compounds and/or polymers which contain from 2 to 8 hydroxyl groups, especially those with a molecular weight of from 80 to about 10,000 and, preferably, from 1,000 to about 6,000 e.g., polyesters, polyethers, polythioethers, polyacetals, polycarbonates, or polyester amides containing at least 2, generally from 2 to 8, but, preferably, from 2 to 4 hydroxyl groups. Compounds which contain amino groups, thiol groups or carboxyl groups may be used. Polyhydroxyl compounds (polyols) which already contain urethane or urea groups, modified or unmodified natural polyols, e.g., castor oil, carbohydrates and starches, may also be used. Additional products of alkylene oxides with phenolformaldehyde resins or urea-formaldehyde resins are also suitable for the purpose of the invention. Polybutadiene polymers with free hydroxyl groups, polysulfide polymers, polybutadiene-styrene copolymers and butadieneacrylonitrile copolymer chains are also suitable for the purpose of the invention.

The hydroxyl-group-containing polyesters (polyols) may be, for example, reaction products of polyhydric alcohols, preferably dihydric alcohols and polybasic, preferably dibasic carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic and/or heterocyclic and may be substituted, e.g., with halogen atoms and may be unsaturated. Examples include succinic acid, adipic acid, suberic acid, azelaic acid, sebacic acid, phthalic acid, anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohol (polyol) may be used such as, for example, ethylene glycol, propylene-1,2- and -1,3-glycol, butylene-1,4- and -2,3-glycol, hexane-1,6-diol, octane-1,8-diol, neopentyl glycol, cyclohexanedimethol-(1,4-bis-hydroxy-methylcyclohexane), 2-methyl-propane-1,3-diol, glycerol, trimethylol propane, hexane-1,2,6-triol, butane-1,2,4-triol, trimethylol ethane, pentaerythritol, quinitol, mannitol, xorbitol, glucose, starches, fructose, cane sugar, dextrines, castor oil, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polyethers with at least 2, generally from 2 to 8 and, preferably, 2 or 3 hydroxyl groups, used according to the invention, are known and may be prepared by the polymerization of epoxides, e.g., ethylene oxide, propyleneoxide, butylene oxide, tetrahydrofuran, styrene oxide or epichlorohydrin, each with itself, e.g., in the presence of BF₃, or by addition of these epoxides, optionally as mixtures or, successively, to starting components which contain reactive hydrogen atoms such as alcohols or amines, e.g., water, ethylene glycol, propylene-1,3- or -1,2-glycol, trimethylol propane, 4,4'-dihydroxydiphenylpropane, aniline, ammonia, ethanolamine or ethylenediamine. Sucrose polyethers such as those described, e.g., in German Pat. Nos. 1,176,358 and 1,064,938, may also be used according to this invention. It is frequently preferred to use polyethers which contain predominantly primary OH groups (up to 90% by weight, based on the total OH group content of the polyether). Polyethers modified with vinyl polymers such as those which may be obtained by polymerizing styrene or acrylonitrile in the presence of polyethers (U.S. Pat. Nos. 3,383,351; 3,304,273; 3,525,093 and 3,110,695; and German Pat. No. 1,152,536), and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers, polythioether esters or polythioether ester amides, depending on the co-components.

The polyacetals used may be, for example, the compounds which may be obtained from glycols, e.g., diethylene glycol, triethylene glycol, (4,4'-dihydroxydiphenyldimethylmethane) hexane-diol and formaldehyde. Polyacetals suitable for the invention may also be prepared by the polymerization of cyclic acetals.

The polycarbonates with hydroxyl groups used may be of the known kind, e.g., those which may be prepared by reacting diols, e.g., propane-1,3-diol, butane-1,4-diol and/or hexane-1,6-diol or diethylene glycol, triethylene glycol or tetraethylene glycol, with diarylcarbonates, e.g., diphenylcarbonate or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Suitable polyepoxy compounds and/or resins may be mixed with the aldehyde lignin-cellulose silicate polyepoxy, then cured with the curing agent to produce lignin-cellulose silicate epoxy products.

The polyepoxides to be used by the new process of the invention comprise those materials possessing more than one, preferably, at least two, vicinal epoxy groups, i.e.;

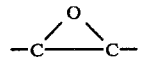

groups. These compounds may be saturated or unsaturated, aliphatic, cycloaliphatic, aromatic or heterocyclic, and may be substituted, such as chlorine, hydroxyl group, ether radicals and the like. They may be monomeric or polymeric. The most common or conventional epoxy resins are obtained by reacting epichlorohydrin with a polyhydroxyl compound, such as Bisphenol A, in the presence of a catalyst.

For clarity, many of the polyepoxides, particularly those of the polymeric type, are described in terms of epoxy equivalent values. The meaning of this expression is described in U.S. Pat. No. 2,633,458. The polyepoxides used in the present process are those having an epoxy equivalency greater than 1.0. Various examples of polyepoxides that may be used in the process of this invention are given in U.S. Pat. No. 2,633,458 and it is to be understood that much of the disclosure of that patent which is relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example: di(2,3-epoxybutyl) adipate; di(2,3-epoxybutyl) oxalate; di(3,3-epoxyhexyl) succinate; di(3,4-epoxybutyl) maleate; di(2,3-epoxyoctyl) pimetate; di(2,3-epoxy-butyl) phthalate; di(2,3-epoxyoctyl) tetrahydrophthalate; di(4,5-epoxydodecyl) maleate; di(2,3-epoxybutyl) terephthalate; di(2,3-epoxypentyl) thiodipropionate; di(5,6-epoxytetradecyl) diphenyldicarboxylate; di(3,4-epoxybutyl) sulfodibutyrate; tri(2,3-epoxybutyl) 1,2,2-butanetricarboxylate; di(5,6-epoxypentadecyl) 1,2,4-butanetricarboxylate; di(5,6-epoxypentadecyl) tartrate; di(4,5-epoxytetradecyl) maleate; di(2,3-epoxybutyl) azelate; di(3,4-epoxybutyl) citrate; di(5,6-epoxyoctyl) cyclohexane-1,2-dicarboxylate; and di(4,5-epoxyoctadecyl) malonate.

Another group of the epoxy-containing materials includes those epoxidized esters of the unsaturated alcohol and unsaturated carboxylic acids such as 2,3-epoxybutyl 3,4,3,4-epoxypentanoate; 3,4-epoxyhexyl 3,4-epoxyoctanoate; 3,4-epoxycyclohexyl 3,4-epoxycyclohexanoate; 3,4-epoxycyclohexyl 3,4-epoxyoctanoate; 2,3-epoxycyclohexylmethyl epoxycyclohexane carboxylate.

Still another group of the epoxy-containing materials included epoxidized derivatives of polyethylenically unsaturated polycarboxylic acids such as, for example:
dimethyl 8,9,12,13-diepoxydiconsanedioate;
dibutyl 7,8,11,12-diepoxyoctadecanedioate;
dioctyl 10,11-diethyl-9,9,12,13-diepoxyconsanedioate;
dihexyl 6,7,10,11-diepoxyhexadecanedioate;
didecyl 9-epoxy-ethyl-10,11-epoxyoctadecanedioate;
dibutyl 3-butyl-3,4,5,6-diepoxycyclohexane-1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate; and 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-diconsanedienedioic acid with ethylene glycol; the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers, butadiene-styrene copolymers and the like.

Another group comprises the glycidyl-containing nitrogen compounds, such as diglycidyl aniline and diene triglycidylamine.

The polyepoxides that are particularly preferred for use in the composition of the invention are the glycidyl ethers, particularly, the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B which are described in the above-noted U.S. Pat. No. 2,633,458 are good examples of polyepoxides of this type.

Any suitable phenoxy resin may be cured with the aldehyde lignin-cellulose silicate polyepoxy resin by use of a curing catalyst, e.g., Lewis acid.

Suitable phenoxy resins are those comprising recurring units having the formula:

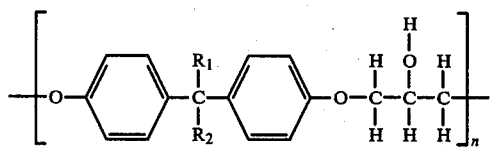

wherein $R_1$ and $R_2$ are each selected from the group consisting of hydrogen and alkyl radicals, the total number of carbon atoms in $R_1$ and $R_2$ being up to 12; and n is an integer having a value of at least two.

The basic chemical structure of phenoxy resins is similar to that of epoxy resins. Phenoxy resins, however, can be readily distinguished as a separate and unique resin class, differing from epoxides in several important characteristics, not having terminal, highly-reactive epoxy groups and being stable materials which have infinite shelf life. Phenoxy resins are thermoplastic. The phenoxy resins may be obtained by condensing epichlorohydrin with a suitable dihydroxy organic compound. Best results are obtained when using Bisphenol-A, [2,2-(4-bishydroxyphenol)-propane], in the preparation of the resin, and this is considered to be the preferred polyhydroxy compound. Other hydroxy-containing compounds such as resorcinol, hydroquinone, glycols, glycerol and mixtures thereof may be used in mixture with, or in lieu of, the hydroxy alkanes if desired. The di(monohydroxyaryl)-alkanes, however, are preferred; with, as noted above, Bisphenol-A, being the most preferred embodiment. The di-(monohydroxyaryl) alkanes were previously listed in the invention.

The organic polyhydroxyl compound will react chemically with the polyfunctional epoxy compound.

The phenoxy resins may be mixed with the aldehyde lignincellulose silicate resin in any suitable proportions. The phenoxy resins may be mixed in the ratio of up to 100 parts by weight to 100 parts by weight of the aldehyde lignin-cellulose silicate resin.

Surface-active additives may also be used according to the invention. Suitable emulsifiers are, e.g., the sodium salts of ricinoleic sulphonates or of fatty acids, or salts of fatty acids with amines, e.g., oleic acid diethylamine or stearic acid diethylamine or stearic acid diethanolamine. Other surface-active additives are alkali metal or ammonium salts of sulphonic acids, e.g., dodecylbenzone sulphonic acid or dinaphthyl methane disulphonic acid, or of fatty acids, e.g., ricinoleic acid, or of polymeric fatty acids.

The aldehyde lignin-cellulose silicate polyepoxy resin may be utilized as an adhesive by mixing about 2 parts by weight of aldehyde lignin-cellulose silicate resin with about 1 part by weight of a curing catalyst, diethylenetriamine, applying the mixture on two boards, then placing them together. The mixture hardens in a short period of time to produce a solid bond between the boards.

The aldehyde lignin-cellulose silicate polyepoxy resin mixed with a curing catalyst, an amino-terminated vegetable oil reacted with triethylenetetramine, in about equal proportions, is applied to layers of fiber glass cloth where it solidifies into a solid, reinforced panel which may be used in boat construction, building construction, furniture, etc.

The aldehyde lignin-cellulose silicate polyepoxy resin containing an organic polyhydroxyl compound is diluted with epichlorohydrin until it is fluid, then mixed with a curing agent, an amino-terminated maleic anhydride-diethylene condensation product, then painted on wood. It hardens in a short period of time to produce a tough, somewhat elastic coating agent.

The mixture of about equal parts of aldehyde lignin-cellulose silicate polyepoxy resin and a polyepoxy compound, glycidyl ether of Bisphenol-A, is mixed with about equal parts of the amino-terminated propylene oxide-diethylenetriamine condensation product, then poured into molds of useful objects such as tubes, sheets, knobs, handles, gears, etc. The mixture solidifies in a short period of time, producing the aforesaid useful objects.

The aldehyde lignin-cellulose silicate polyepoxy resin may be utilized as a molding material by mixing with about equal parts of a phenoxy resin, condensation product of epichlorohydrin with Bisphenol-A, and maleic acid in the amount of 15%, based on the total weight of the mixture. The mixture is placed in a mold and heated to from about 150° C. to 200° C. for about 30 minutes, thereby producing a hard, tough product. The aldehyde lignin-cellulose silicate polyepoxy resin containing the phenoxy resin may also be used in the production of electrophotographic materials.

Typical uses of aldehyde lignin-cellulose silicate polyepoxy resins include protective coating, adhesives, laminates, potting, castings, compression and transfer molding.

Organic or inorganic fillers may be added to the aldehyde lignin-cellulose silicate polyepoxy resins. Fillers such as metallic powder, e.g., Fe-, Al-, Zn-, Cu-metallic oxide powder, sand, asbestos, powdered mica, bentonite, glass fibers, clay, talc, zeolites, expanded clay, C-fibers, graphite, steel wool, bronze or copper cloth, silicon powder, basalt wool or powder, carbon black, glass powder, lava and pumice particles, wood chips, sawdust, cork, cotton, straw, jute, sisal, hemp, flax, rayon, popcorn, plastic and rubber waste and the like may be added to the aldehyde lignin-cellulose silicate polyepoxy resins.

Suitable plasticizers, such as dibutyl phthalate, tricresyl phosphates, polysulfides, polyamides and fatty diamines, react with aldehyde lignin-cellulose silicate polyepoxy resins and internally plasticize the cured resin.

Suitable reactive diluents may be used, such as epihalohydrins and acetonitriles which also react with the aldehyde lignin-cellulose silicate polyepoxy resins.

Any suitable phenol compound may be used in this invention, such as phenol, cresols, cresylic acid, creosote, xylenols, cashew nutshell liquid, anacordol; p-tert-butyl phenol; cardol, 2,6-dimethyl phenol; chlorophenol; nitrophenol, phenolic acid extracted from bark (U.S. Pat. No. 3,371,054), and mixtures thereof. The phenols react with Component A and the aldehyde radical in Component B. The phenols are also solvents for Component B.

Any suitable halohydrin compound may be used in this invention, such as alkene chlorohydrins, e.g., ethylene chlorohydrin, alphadichlorohydrin, dibromohydrin, di-iodohydrin, glycerol-monochlorohydrin, and mixtures thereof. They will react with both Components A and B. Alkene chlorohydrins have the general formula, wherein R is an alkene:

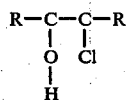

Any suitable mono-epoxide compound may be used in this invention, such as alkylene oxide ($C_2$-$C_4$) e.g., ethylene oxide, propylene oxide, butylene oxide, tetrahydrofuran, styrene oxide or mixtures thereof. It is preferred to add the ethylene oxide at a pressure wherein the ethylene oxide is in a liquid state or a compressed state.

Components A and B and a polyfunctional amino curing agent may be mixed and reacted, preferably in an aqueous solution, to produce a thermosetting aldehyde lignin-cellulose silicate epoxy resin which may be used in the production of paper, especially in "wet-strength" type paper. The aldehyde lignin-cellulose silicate epoxy resin in an aqueous solution is applied to the cellulose fiber mat, then heated to from 80° C. to 120° C. while being pressed into a sheet of paper.

The aldehyde lignin-cellulose silicate polyepoxy resin may be cured with a polyisocyanate or an isocyanate-terminated polyurethane prepolymer. About 50 to 200 parts by weight of the aldehyde lignin-cellulose silicate polyepoxy resin are reacted with about 100 parts by weight of a polyisocyanate, thereby producing polyurethane silicate foams and resinous products.

Any suitable polyisocyanate, polyisothiocyanate and isocyanate-terminated polyurethane may be used in this invention to produce polyurethane foams and resinous products. Suitable organic polyisocyanates include aliphatic, cycloaliphatic, araliphatic, aromatic and heterocyclic polyisocyanates and mixtures thereof. It is generally preferred to use commercially readily-available polyisocyanates, e.g., tolylene-2,4- and -2,6-diisocyanate and any mixture of these isomers which are known commercially as "TDI", polyphenylpolymethyleneisocyanates obtained by aniline-formaldehyde condensation followed by phosgenation which are known commercially as "crude MDI", and modified polyisocyanates. Suitable polyisocyanates which may be used according to the invention are described, e.g., by W. Siefken in Justus Liebigs Annalen der Chemie, 562, pages 75 to 136.

Polyisocyanate catalyst, up to 10% by weight, percentage based on reactants, may be used in this invention: Tertiary amines, e.g., triethyleneamine, triethylenediamine, triethanolamine and the like; organo-metallic compounds, e.g., tin acetate, tin octoate, tin dilaurate and the like and mixtures thereof. Other examples of catalysts which may be used according to the invention and details of their action are described in Kunststoff-Handbuch, Volume VII, published by Vieweg and Hochtlen, Carl-Hanser-Verlag, Munich, 1966, e.g., on pages 96 and 102.

Suitable blowing agents in an amount up to 50% by weight, percentage based on reactants, may be used in this invention, suitable blowing agents including water and chemically inert blowing agents, boiling within the range of −25° C. to 80° C., e.g., halogenated alkanes, acetone, ethyl acetate and the like. Other examples of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510. Compressed air may also be used as the blowing agent.

Suitable foam stabilizers in an amount up to 20% by weight, percentage based on reactants, such as water-soluble polyester siloxanes, are described in U.S. Pat. No. 3,629,308. Suitable emulsifiers, which were previously listed in this Specification, may be used in an amount up to 20% by weight, based on the reactants.

Suitable fire-retardant substances may be used in this invention; the halogenated paraffins and inorganic salts of phosphoric acid are the preferred fire-retardant agents which may be used in an amount up to 20% by weight, percentage based on the reactants. Inorganic and organic fillers may be used in producing polyurethane.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 3 parts by weight of lye flakes (NaOH) 1 part by weight of hydrated silica powder and 2 parts by weight of fir sawdust are mixed, then heated to between 150° C. and 220° C. while agitating at ambient pressure, with care being taken that the mixture does not burn, for 5 to 60 minutes or until the mixture softens and expands into a dark-brown, thick liquid when hot. It cools to a solid, thereby producing a broken-down alkali metal plant silicate polymer which is water-soluble and has lost a $CO_2$ radical per molecule.

Other plant particles may be used in place of fir sawdust, such as:

| | |
|---|---|
| (a) oak sawdust, | (h) paper, |
| (b) ash sawdust, | (i) oat straw, |
| (c) seaweed, | (j) grass clippings, |
| (d) cotton, | (k) pine sawdust, |
| (e) corn cobs, | (l) equal parts of paper and fir sawdust. |
| (f) cotton stalks, | |
| (g) bagasse, | |

4 parts by weight of the broken-down alkali metal plant silicate polymer are mixed with 4 parts by weight of an aqueous solution containing 37% formaldehyde, then heated to between 70° C. and 100° C. while agitating for 30 to 120 minutes, thereby producing alkali metal formaldehyde lignin-cellulose silicate polymer.

EXAMPLE 2

About 2 parts by weight of sodium hydroxide are heated to from 150° C. to 220° C.; then 2 parts by weight of a plant particle, listed below, and 1 part by weight of dry granular silicic acid are mixed, then heated to between 150° C. and 220° C. while agitating at ambient pressure for 5 to 60 minutes or until the mixture softens and expands into a thick brown liquid which solidifies on cooling, thereby producing a broken-down alkali metal plant silicate polymer. The polymer is ground into small particles.

| | |
|---|---|
| (a) fir sawdust, | (j) equal mixture of (a) and cotton, |
| (b) oak sawdust, | (k) pine sawdust, |
| (c) beech sawdust, | (l) maple sawdust, |
| (d) redwood sawdust, | (m) elm sawdust, |
| (e) gum sawdust, | (n) corn cob particles, |
| (f) sycamore sawdust, | (o) seaweed particles, |
| (g) cotton stalk particles, | (p) cornstalk particles, |
| (h) mixture of weed particles, | (q) bugasse particles, |
| (i) equal mixture of (a) and newspapers, | (r) mixtures thereof. |

About 2 parts by weight of the broken-down alkali metal plant silicate polymer and 1 part by weight of acetaldehyde are mixed, then heated to between 70° C. and 100° C. while agitating for 30 to 120 minutes, thereby producing alkali metal acetaldehyde lignin-cellulose silicate polymer.

EXAMPLE 3

About 10 parts by weight of potassium hydroxide are melted, then 8 parts by weight of plant particle selected from the list below and 4 parts by weight of a hydrated silica are mixed, then heated to between 150° C. and 220° C. while agitating at ambient pressure for 5 to 60 minutes or until the mixture softens and expands into a dark-brown, thick liquid, thereby producing a broken-down alkali metal plant silicate polymer. The polymer is ground into small particles.

| | |
|---|---|
| (a) fir sawdust, | (g) rice straw particles, |
| (b) pine sawdust, | (h) wheat straw particles, |
| (c) seaweed particles, | (i) bagasse particles, |
| (d) corn cob particles, | (j) oak sawdust, |
| (e) corn stalk particles, | (k) gum sawdust, |
| (f) ash sawdust, | (l) cedar sawdust. |

About 4 parts by weight of the broken-down alkali metal plant silicate polymer and 6 parts by weight of an aqueous solution containing 25% formaldehyde are mixed, then heated to between 70° C. and 100° C. while agitating for 30 to 120 minutes, thereby producing alkali metal formaldehyde lignin-cellulose silicate polymer.

Other aldehydes may be used in place of formaldehyde, such as acetaldehyde, propionaldehyde, furfural, acrolein, butyl aldehyde, benzaldehyde, paraformaldehyde and mixtures thereof.

EXAMPLE 4

About equal parts by weight of the alkali metal aldehyde lignin-cellulose silicate polymer as produced in Example 1a and epichlorohydrin are thoroughly mixed, then heated to just below the boiling temperature of epichlorohydrin while agitating for 30 to 90 minutes, thereby producing aldehyde lignin-cellulose silicate polyepoxy resin and sodium chloride.

EXAMPLE 5

About equal parts by weight of the alkali metal aldehyde lignin-cellulose silicate polymer as produced in Example 2a, water and epichlorohydrin are mixed, then heated for 30 to 90 minutes at a temperature just below the boiling temperature of epichlorohydrin while agitating at ambient pressure. The temperature is then elevated to just above the boiling point of water while agitating so as to evaporate most of the water, thereby producing aldehyde lignin-cellulose silicate polyepoxy resin and sodium chloride.

Other polyfunctional epoxide compounds may be used in place of epichlorohydrin, such as epibromohydrin, methyl epichlorohydrin, epifluorohydrin, epiiodohydrin and trichlorobutylene oxide and mixtures thereof.

EXAMPLE 6

About 2 parts by weight of epichlorohydrin are mixed with 3 parts by weight of the alkali metal aldehyde lignin-cellulose silicate polymer produced in Example 2b, then heated to just below the boiling temperature of epichlorohydrin while agitating at ambient temperature for 30 to 90 minutes, thereby producing aldehyde lignin-cellulose silicate polyepoxy resin and sodium chloride.

EXAMPLE 7

About 2 parts by weight of the alkali metal aldehyde lignin-cellulose silicate polymer as produced in Example 2k and 1 part by weight of water are mixed, then epichlorohydrin is added in an amount wherein the chlorine atoms and sodium atoms are about equal. The mixture is then added to an autoclave with a mixer and heated to just below the boiling temperature of epichlorohydrin while agitating for 30 to 90 minutes, thereby producing aldehyde lignin-cellulose silicate polyepoxy resin. The resin is then diluted with an organic solvent, such as epichlorohydrin, ethylene chlorohydrin or other solvents. The salt and unreacted sawdust settle to the bottom and the resin is decanted off. The solvent is then removed by distillation, thereby recovering the aldehyde lignin-cellulose silicate epoxy resin.

Other polyfunctional epoxide compounds may be used in place of epichlorohydrin, such as trichlorobutylene oxide, epibromohydrin, methyl epichlorohydrin, epifluorohydrin, epiiodohydrin and mixtures thereof.

EXAMPLE 8

About 4 parts by weight of the alkali metal aldehyde lignin-cellulose silicate polymer as produced in Example 1b, 2 parts by weight of epichlorohydrin and 2 parts by weight of trichlorobutylene oxide are mixed in an autoclave, then heated to just below the boiling temperature of epichlorohydrin while agitating for 30 to 90 minutes at about 30 psig, thereby producing an aldehyde lignin-cellulose silicate polyepoxy resin.

EXAMPLE 9

Example 8 is modified by using methyl epichlorohydrin in place of trichlorobutylene oxide.

EXAMPLE 10

About 4 parts by weight of the alkali metal aldehyde lignin-cellulose silicate polymer as produced in Example 2i, 1 part by weight of ethylene chlorohydrin and 2 parts by weight of epichlorohydrin are mixed in an autoclave, then heated to just below the boiling temperature of epichlorohydrin while agitating for 30 to 90 minutes, thereby producing aldehyde lignin-cellulose silicate polyepoxy resin and sodium chloride.

EXAMPLE 11

About 4 parts by weight of the alkali metal aldehyde lignin-cellulose silicate polymer as produced in Example 3a, 1 part by weight of water, 1 part by weight of resorcinol and 4 parts by weight of epichlorohydrin are added to an autoclave, then heated to just below the boiling point of epichlorohydrin while agitating for 30 to 90 minutes, thereby producing aldehyde lignin-cellulose silicate polyepoxy resins and potassium chloride.

EXAMPLE 12

About 2 parts by weight of alkali metal aldehyde lignin-cellulose silicate polymer as produced in Example 2k, 1 part by weight of the alkali metal aldehyde lignin-cellulose silicate polymer as produced in 2 g, 2 parts by weight of Bisphenol-A, 1 part by weight of water and an amount of epichlorohydrin wherein the chloride atoms and sodium atoms are about equal are added to an autoclave, then heated to a temperature just below the boiling point of epichlorohydrin at 20 psig while agitating for 30 to 90 minutes, thereby producing as aldehyde lignin-cellulose silicate polyepoxy resin.

EXAMPLE 13

About 3 parts by weight of the alkali metal aldehyde lignin-cellulose silicate polymer as produced in Example 2j, 1 part by weight of glycerol and 3 parts by weight of epichlorohydrin are mixed, then heated to a temperature just below the boiling temperature of epichlorohydrin while agitating for 30 to 90 minutes, thereby producing aldehyde lignin-cellulose silicate polyepoxy resin and salt.

EXAMPLE 14

About 2 parts by weight of alkali metal aldehyde lignin-cellulose silicate polymer as produced in Example 1c, 2 parts by weight of the alkali metal aldehyde lignin-cellulose silicate polymer as produced in Example 3b, 2 parts by weight of propylene glycol, and 4 parts by weight of epichlorohydrin are added to an autoclave, then heated to just below the boiling temperature of epichlorohydrin at 20 psig while agitating for 30 to 90 minutes, thereby producing aldehyde lignin-cellulose silicate polyepoxy resin.

EXAMPLE 15

About 4 parts by weight of the alkali metal aldehyde lignin-cellulose silicate polymer as produced in Example 2b, 2 parts by weight of resorcinol and 2 parts by weight of epichlorohydrin are added to an autoclave, then heated to a temperature just below the boiling point of epichlorohydrin at 15 psig while agitating for 30 to 90 minutes, thereby producing an aldehyde lignin-cellulose silicate polyepoxy and sodium chloride.

EXAMPLE 16

About 4 parts by weight of the alkali metal aldehyde lignin-cellulose silicate polymer as produced in Example 1(1), 1 part by weight of ethylene chlorohydrin, 2 parts by weight of epichlorohydrin and 0.5 part by weight of epibromohydrin are mixed, then heated to a temperature just below the boiling temperature of epichlorohydrin while agitating for 30 to 90 minutes, thereby producing an aldehyde lignin-cellulose silicate polyepoxy resin and sodium chloride.

EXAMPLE 17

About 3 parts by weight of the alkali metal aldehyde lignin-cellulose silicate polymer as produced in Example 2c, 1 part by weight of a liquid formaldehyde phenol resin produced in the presence of an acidic catalyst and containing free aldehyde radicals, and 3 parts by weight of epichlorohydrin are mixed, then heated to just below the boiling temperature of epichlorohydrin while agitating for 30 to 90 minutes, thereby producing aldehyde lignin-cellulose silicate polyepoxy resin.

EXAMPLE 18

About 3 parts by weight of the alkali metal aldehyde lignin-cellulose silicate polymer as produced in Example 2a, 1 part by weight of a formaldehyde urea resin containing free aldehyde radicals, and 3 parts by weight of epichlorohydrin are mixed, then heated to just below the boiling temperature of epichlorohydrin while agitating for 30 to 90 minutes, thereby producing an aldehyde lignin-cellulose silicate polyepoxy resin.

EXAMPLE 19

About 3 parts by weight of the alkali metal aldehyde lignin-cellulose silicate polymer as produced in Example 2a, 1 part by weight of phenol and 5 parts by weight of epichlorohydrin are mixed, then heated to just below the boiling temperature of epichlorohydrin while agitating for 30 to 90 minutes, thereby producing an aldehyde ligning-cellulose silicate polyepoxy resin. The resin is then heated to between 80° C. and 150° C. for 3 to 20 minutes, thereby producing a solid epoxy silicate product. The polyepoxy silicate product is ground into a powder, washed with water, then filtered to remove the salt. The powder is then dried. The aldehyde lignin-cellulose silicate polyepoxy product is soluble in organic solvents such as ethylene chlorohydrin, organic polyhydroxy compounds and phenols and may be used as a coating agent on cloth, wood and metal, as an adhesive and as an impregnant. The dried powder may also be used as molding powder, being molded into useful objects by heat and pressure. The aldehyde lignin-cellulose silicate polyepoxy powder may be added to a polyol and reacted with a polyisocyanate to produce a strong, rigid polyurethane silicate foam which may be used for insulation and other construction uses.

EXAMPLE 20

About equal parts by weight of epichlorohydrin and alkali metal aldehyde lignin-cellulose silicate polymer as produced in Example 3d are mixed, then heated to a temperature between ambient temperature and the boiling temperature of epichlorohydrin while agitating at ambient pressure for 30 to 90 minutes, thereby producing aldehyde lignin-cellulose silicate polyepoxy resin. About equal parts by weight of the polyepoxy silicate resin and phenoxy resin which is produced by reacting epichlorohydrin with Bisphenol-A are mixed, then about equal parts by weight, based on the phenoxy resin of phthalic anhydride, are mixed with the mixture of phenoxy resin and aldehyde lignin-cellulose silicate polyepoxy, then heated to just above the melting point of phthalic anhydride while agitating for 10 to 30 minutes, thereby producing an aldehyde lignin-cellulose silicate epoxy product. The aldehyde lignin-cellulose silicate polyepoxy resin, while still in a fluid state, may be poured into molds of useful products such as gears, pulley wheels, knobs, etc. Fillers, coloring reagents or reinforcing agents such as fiber glass may be added to the aldehyde lignin-cellulose silicate epoxy product while still in a fluid state.

EXAMPLE 21

About 10 parts by weight of the aldehyde lignin-cellulose silicate polyepoxy resin as produced in Example 20 and 10 parts by weight of a polyepoxy compound, a glycidil polyether of 2,2-bis(4-hydroxyphenyl) propane containing at least 2 epoxy radicals per molecule, and 10 parts by weight of diethylenetriamine are mixed, then applied to the surface of two boards. The boards are placed one on top of the other with the resin between and the resin hardens in 10 to 90 minutes, thereby producing a strong bond between the two boards.

EXAMPLE 22

About 100 parts by weight of the aldehyde alkali metal lignin-cellulose silicate polymer as produced in Example 2b, 20 parts by weight of ethylene chlorohydrin, 20 parts by weight of propylene glycol, 10 parts by weight of triethanolamine, 10 parts by weight of epichlorohydrin are mixed, then agitated at ambient temperature and pressure for 10 to 30 minutes, thereby producing a liquid aldehyde lignin-cellulose silicate epoxy product.

About equal parts by weight of the liquid aldehyde lignin-cellulose silicate polyepoxy product and 4,4'-diphenyl methylene diisocyanate are mixed with 10% by weight of a blowing agent, methylene chloride, based on the weight of the polyisocyanate. The mixture begins to expand in about 15 seconds and expands to produce a tough, rigid polyurethane silicate foam which weighs about 1.5 to 2 lbs./cu.ft.; it has a cream time of 40 to 80 seconds and a tack-free time of 60 to 220 seconds. The polyurethane silicate foam has many well known uses such as sound and thermal insulation, door cores, construction components, art objects, floatation in boats, etc.

Other polyisocyanates may be used in place of 4,4'-diphenylmethylene diisocyanate such as tolylene diisocyanate, polyphenyl polymethylene isocyanates and mixtures thereof.

EXAMPLE 23

About 100 parts by weight of the alkali metal aldehyde lignin-cellulose silicate polymer as produced in Example 1k, 20 parts by weight of ethylene chlorohydrin, 50 parts by weight of propylene oxide and 100 parts by weight of epichlorohydrin are mixed, then 10 parts by weight of dimethylethanolamine and 5 parts by weight of triethylenediamine are added and thoroughly mixed at ambient temperature. The mixture is then agitated for 10 to 30 minutes, thereby producing a liquid aldehyde lignin-cellulose silicate epoxy resin.

About 10 parts by weight of the aldehyde lignin-cellulose silicate epoxy resin, 7 parts by weight of crude MDI (polyphenylpolymethylene-isocyanates obtained by aniline-formaldehyde condensation followed by phosgenation) and 2 parts by weight of trichlorotrifluoroethane are mixed. The mixture expands to produce a rigid, tough, light-brown-colored polyurethane silicate foam.

Other polyisocyanates may be used in place of crude MDI such as tolylene diisocyanate, 4,4'-diphenyl methylene diisocyanate and mixtures thereof.

Other epoxide compounds may be used in place of propylene oxide such as butylene oxide, tetrahydrofuran, styrene oxide and ethylene oxide. It is preferred to use elevated pressure wherein the ethylene oxide is in a liquid state.

EXAMPLE 24

About equal parts by weight of the aldehyde lignin-cellulose silicate polyepoxy resin as produced in Example 7 and diethylenetriamine-linoleic acid condensation with at least 2 amine radicals per molecule are mixed at 25° C., then applied between 2 pieces of wood in a thin layer. The resin is cured within 12 hours and produces a strong bond between the two pieces of wood.

EXAMPLE 25

About 10 parts by weight of the aldehyde lignin-cellulose silicate polyepoxy resin as produced in Example 7 and 5 parts by weight of a mercaptan-terminated liquid compound produced by reacting ethylenechloride and sodium polysulfide are mixed, then heated in a mold to between 80° C. and 120° C., thereby producing a tough, solid aldehyde lignin-cellulose silicate epoxy product.

EXAMPLE 26

About 3 parts by weight of the aldehyde lignin-cellulose silicate polyepoxy resin as produced in Example 18 are mixed with 2 parts by weight of propyleneoxide-diethylenetriamine resin with at least two amine radicals on each molecule, then poured into a mold of an art object and the mixture hardens in 30 minutes to 12 hours to produce an aldehyde lignin-cellulose silicate epoxy product.

EXAMPLE 27

About 3 parts by weight of the uncured liquid aldehyde lignin-cellulose silicate polyepoxy resin as produced in Example 19 are mixed with 2 parts by weight of a polyamide with at least two free amine radicals per molecule, then applied on layers of fiber glass. The resin cures to produce a strong, rigid panel which may be used to build boats, construction panels, containers, etc.

EXAMPLE 28

About equal parts by weight of the aldehyde lignin-cellulose silicate polyepoxy resin as produced in Example 5, trichlorobutylene oxide and triethylenetetramine are mixed, then applied to the top surface of two pieces of wood, then the coated surfaces are placed together and after 24 hours, a strong bond is obtained between the pieces of wood.

EXAMPLE 29

About 3 parts by weight of the aldehyde lignin-cellulose silicate polyepoxy resin as produced in Example 17, 0.5 part by weight of cresylic acid and 3 parts by weight of the reaction product of phenyl glycidyl ether and diethylenetriamine containing at least 2 free amine radicals per molecule are mixed, then placed in a crack in a piece of polyester fiber glass panel where it is cured within 12 hours, bonds the edges and fills the cavity in the panel.

EXAMPLE 30

About 3 parts by weight of the aldehyde lignin-cellulose silicate polyepoxy resin as produced in Example 20, 1 part by weight of methyl methacrylate and 2 parts by weight of diethylenetriamine are mixed, then poured into a mold for a tool handle. The mixture cures to produce a tough solid aldehyde lignin-cellulose silicate epoxy product.

The emulsion may be reacted with a polyisocyanate to produce a foamed product which may be used for sound and thermal insulation.

Although specific conditions and ingredients have been described in conjunction with the foregoing examples of preferred embodiments, these may be varied, and other reagents and additives may be used where suitable, as described above, with similar results.

Other modifications and applications of this invention will occur to those skilled in the art upon reading this disclosure. These are intended to be included within the scope of this invention, as defined in the appended claims.

I claim:

1. The process for the production of foamed polyurethane silicate resinous product by the following steps:
   (a) mixing and reacting 10 to 200 parts by weight of a polyfunctional epoxide compound and 50 parts by weight of an alkali metal aldehyde broken down lignin-cellulose silicate polymer thereby
   (b) producing an aldehyde broken down lignin-cellulose silicate polyepoxy resin; then
   (c) mixing and reacting 100 parts by weight of a polyisocyanate, up to 10% by weight of a polyisocyanate catalyst, up to 50% by weight of a blowing agent, up to 20% by weight of a foam regulator and 50 to 200 parts by weight of the aldehyde broken down lignin-cellulose silicate polyepoxy resin, percentage based on reactants, thereby
   (d) producing a polyurethane silicate foam.

2. The product produced by the process of claim 1.

3. The process of claim 1 wherein the polyfunctional epoxide compound is selected from the group consisting of epichlorohydrin, epibromohydrin, methyl epichlorohydrin, di-epi-iodohydrin, epifluorohydrin, epi-iodohydrin and trichlorobutylene oxide.

4. The process of claim 1 wherein the polyfunctional epoxide compound is epichlorohydrin.

5. The process of claim 1 wherein up to 200 parts by weight of water are added to the alkali metal aldehyde broken down lignin-cellulose silicate polymer before adding the polyfunctional epoxide compound.

6. The process of claim 1 wherein up to 50 parts by weight of a polyhydroxyl compound are added in step (a) of claim 1 with the other components.

7. The process of claim 6 wherein the organic polyhydroxy compound is selected from the group consisting of di(monohydroxy) alkanes, di(monohydroxyaryl) alkanes, resorcinol, hydroquinone glycols, glycerol, trimethylol propane, polyesters with 2 or more hydroxyl groups per molecule, polyethers with 2 or more hydroxyl groups per molecule, polyamides with 2 or more hydroxyl groups per molecule, Bisphenol-A and mixtures thereof.

8. The process of claim 1 wherein up to 50 parts by weight of a phenol compound, selected from the group consisting of phenol, cresol, cresylic acid, creosote, xylenols, cashew nutshell liquid, anacordol, p-tert-butyl phenol, p-tert-amyl phenol, phenolic acids produced from bark and mixtures thereof are added in step (a) of claim 1 with the other components.

9. The process of claim 1 wherein up to 50 parts by weight of halohydrin compound, selected from the group consisting of alkene halohydrins are added in step (a) of claim 1 with the other components.

10. The process of claim 1 wherein up to 100 parts by weight of a mono-epoxide compound, selected from the group consisting of ethylene oxide, propylene oxide, butylene oxide, tetrahydrofuran, styrene oxide and mixtures thereof and an amine catalyst are added in step (a) of claim 1 with the other components at a pressure wherein the mono-epoxide compound is in a liquid or compressed state.

11. The process of claim 10 wherein the amine catalyst is a tertiary amine.

12. The process of claim 1 wherein a polyisocyanate catalyst selected from the group consisting of tertiary amines, organo-tin compounds and mixtures thereof are added in an amount of up to 10% by weight, percentage based on the reactants in step (c) of claim 1.

13. The product produced by the process of claim 10.

14. The product produced by the process of claim 6.

15. The process of claim 1 wherein the organic polyisocyanate is selected from the group consisting of arylene polyisocyanate, alkylene polyisocyanates, phosgenation products of aniline-formaldehyde condensation and mixtures thereof.

16. The process of claim 1 wherein the organic polyisocyanate is a phosgenation product of aniline formaldehyde condensation.

17. The process of claim 1 wherein an isocyanate-terminated polyurethane prepolymer is utilized in place of the polyisocyanate.

* * * * *